(12) United States Patent
Kuehner et al.

(10) Patent No.: US 11,834,059 B2
(45) Date of Patent: Dec. 5, 2023

(54) LOCATING SMART SHOE RELATIVE TO PEDAL

(71) Applicant: TOYOTA RESEARCH INSTITUTE, INC., Los Altos, CA (US)

(72) Inventors: Manuel Ludwig Kuehner, Los Altos, CA (US); Hiroshi Yasuda, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 182 days.

(21) Appl. No.: 17/154,891

(22) Filed: Jan. 21, 2021

(65) Prior Publication Data

US 2022/0227382 A1 Jul. 21, 2022

(51) Int. Cl.
*B60W 50/10* (2012.01)
*B60W 30/08* (2012.01)
*G06F 1/16* (2006.01)
*B60W 30/18* (2012.01)

(52) U.S. Cl.
CPC ............ *B60W 50/10* (2013.01); *B60W 30/08* (2013.01); *B60W 30/18109* (2013.01); *G06F 1/163* (2013.01); *B60W 2510/18* (2013.01)

(58) Field of Classification Search
CPC .............. B60W 50/10; B60W 30/08; B60W 30/18109; B60W 2510/18; G06F 1/163
See application file for complete search history.

(56) References Cited

U.S. PATENT DOCUMENTS

| | | | |
|---|---|---|---|
| 5,835,008 A * | 11/1998 | Colemere, Jr. ........ | B60Q 1/441 340/576 |
| 6,142,513 A * | 11/2000 | Schoos ................ | B60R 21/015 280/733 |
| 7,395,614 B1 | 7/2008 | Bailey, Sr. | |
| 2003/0067215 A1 | 4/2003 | Rieth | |
| 2005/0075777 A1 | 4/2005 | Kim | |
| 2010/0030458 A1 | 2/2010 | Coughlin | |
| 2011/0090093 A1 | 4/2011 | Grimm | |
| 2012/0055279 A1 | 3/2012 | Van Saanen | |
| 2017/0267254 A1 | 9/2017 | Leppanen | |

(Continued)

FOREIGN PATENT DOCUMENTS

| CN | 203780409 U | 8/2014 |
|---|---|---|
| CN | 110329148 A | 10/2019 |

(Continued)

OTHER PUBLICATIONS

US 10,627,968 B2, 04/2020, Rihn (withdrawn)

(Continued)

*Primary Examiner* — Shardul D Patel
*Assistant Examiner* — Chase L Cooley
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for operating a vehicle using a smart shoe device. For example, some embodiments of the application may monitor operation of a vehicle system and monitor operation of a smart shoe device. The process may determine that the smart shoe device is within a threshold period of time of performing an future action associated with commanding movement of the vehicle and enable a response by the vehicle based on the future action.

16 Claims, 7 Drawing Sheets

(56) References Cited

U.S. PATENT DOCUMENTS

| | | | |
|---|---|---|---|
| 2018/0178676 A1* | 6/2018 | Cech | G01V 3/12 |
| 2019/0016346 A1* | 1/2019 | Park | G05D 1/0088 |
| 2019/0195644 A1* | 6/2019 | Scheufler | H04L 63/105 |
| 2019/0279447 A1* | 9/2019 | Ricci | B60Q 9/00 |
| 2020/0253321 A1 | 8/2020 | Andon | |
| 2020/0297063 A1 | 9/2020 | Andon | |

FOREIGN PATENT DOCUMENTS

| | | |
|---|---|---|
| WO | 2015141198 A1 | 9/2015 |
| WO | 2017201857 A1 | 11/2017 |
| WO | 2018079125 A1 | 5/2018 |

OTHER PUBLICATIONS

Nissan, e-pedal: Easy driving using only the accelerator pedal, 2017, asean.nissannews.com (Year: 2017).*

Cvel, Airbag Deployment Systems, 2017, Clemson University (Year: 2017).*

Hwang, S. et al., "The Haptic Steering Wheel: Vibro-Tactile Based Navigation for the Driving Environment," IEEE, 2010, found at https://www.researchgate.net/profile/Jung-hee_Ryu/publication/224140715_The_Haptic_steering_Wheel_Vibro-tactile_based_navigation_for_the_driving_environment/ links/0deec516254efed064000000/The-Haptic-steering-Wheel-Vibro-tactile-based-navigation-for-the-driving-environment.pdf.

Inc42 Marketing material found at https://inc42.com/startups/lechal-wearable-tech-will-help-find-way/.

Kurihara, Y. et al., "Periodic Tactile Feedback for Accelerator Pedal Control," 2010, found at http://citeseerx.ist.psu.edu/viewdoc/download?doi=10.1.1.705.4374&rep=rep1&type=pdf.

Ochiai, Y. et al., "Invisible Feet Under the Vehicle," AH '12, Mar. 8-9, 2012, ACM, found at https://dl.acm.org/doi/abs/10.1145/2160125.2160156.

Ryu, J. "Vibrotactile Feedback for Information Delivery in the Vehicle," IEEE Transactions on Haptics, vol. 3, No. 2, Apr.-Jun. 2010, found at https://ieeexplore.ieee.org/abstract/document/5383357.

\* cited by examiner

LOCATING SMART SHOE RELATIVE TO PEDAL

TECHNICAL FIELD

The present disclosure relates generally to interactions between smart items and vehicles, and in particular, some implementations may relate to assisting operation of the vehicle in response to a smart shoe or other item of clothing.

DESCRIPTION OF RELATED ART

Autonomous vehicle technology is becoming more commonplace with the introduction of new vehicles each model year. While widespread adoption of fully autonomous vehicles is only now becoming visible on the horizon, semi-autonomous vehicle technology is gaining increasing popularity for assisted driving and other semi-autonomous vehicle operation. Developers within organizations such as major original equipment manufacturers, tier 1 suppliers, and startup companies, are racing to develop autonomous vehicle and advanced driver assistance systems (ADAS) technologies.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
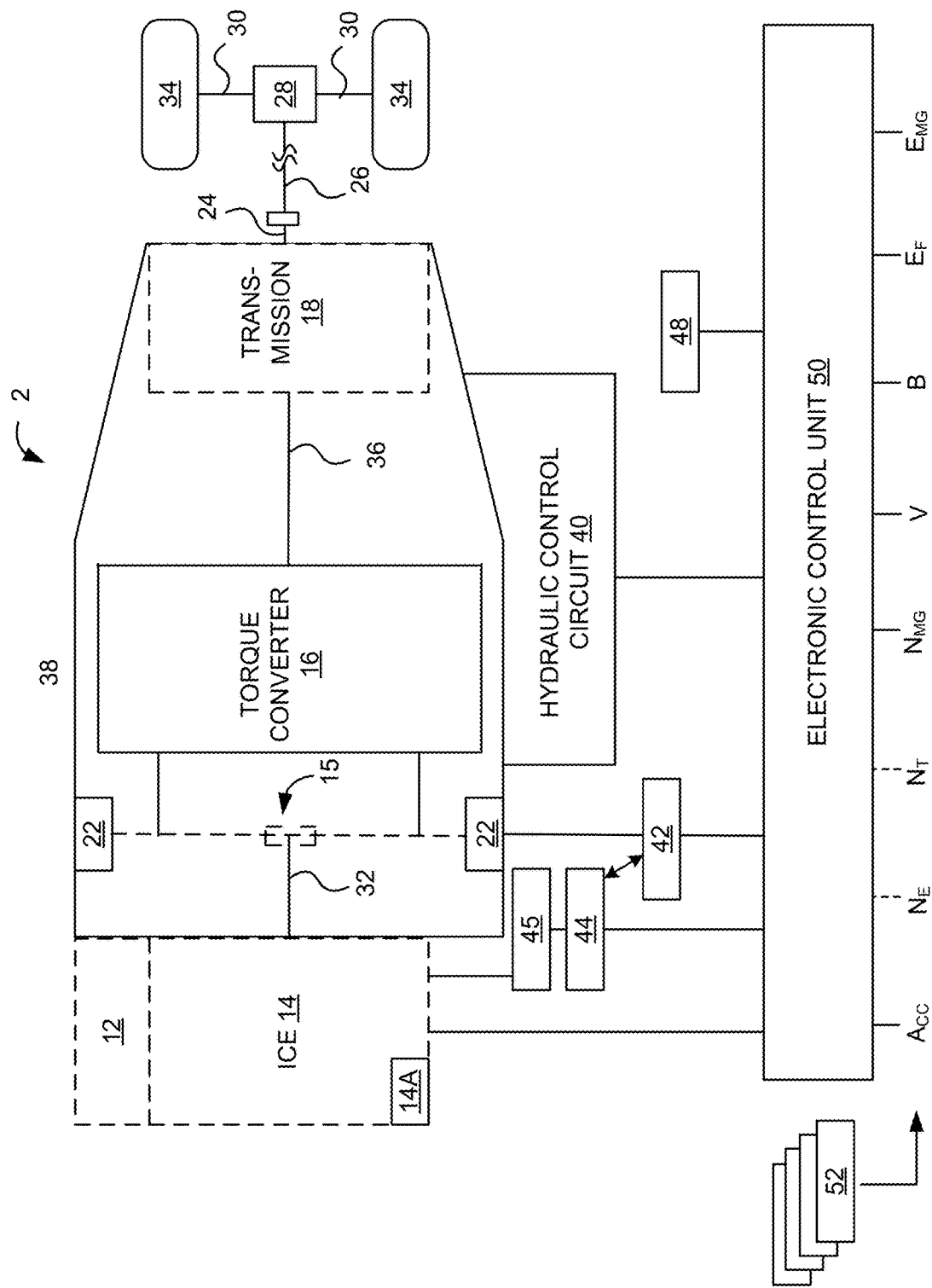
FIG. 1 illustrates an example semi-autonomous vehicle with which embodiments of the disclosed technology may be implemented.

The figures are not exhaustive and do not limit the present disclosure to the precise form disclosed.

DETAILED DESCRIPTION

In traditional vehicle systems, an operator of a vehicle controls the vehicle, e.g., by actuating some vehicle element(s). In response, one or more vehicle systems effectuates operation of the vehicle commensurate with operator-initiated control. For example, when the operator presses the accelerator pedal of a vehicle, that vehicle, traditionally, will speed up by opening the throttle to allow more air/fuel to enter the vehicle's engine. If the operator (mistakenly) presses the accelerator pedal at a time when the operator should instead press the brake pedal, traditional vehicle systems are not able to correct this action and the vehicle will speed up rather than slow down. This can occur in situations, for example, when the operator suddenly becomes aware of an obstacle on the roadway and becomes flustered. The operator may accidentally further press the accelerator pedal, causing the vehicle to speed up and collide with the obstacle, when the operator's actual intention was to apply the brakes. Such a driving error can result in an accident involving injury or even loss of life.

Autonomous and semi-autonomous vehicles are configured to prevent these types of situations and operate the vehicle with minimal assistance from an operator. For example, the semi-autonomous vehicle may assist the operator in determining when to press the accelerator or brake pedal to maneuver the vehicle. Before complete control of the vehicle is handed over from the operator to a fully autonomous vehicle, operations provided by the operator to manage control of the vehicle may be supplemented using an advanced driver assistance system (ADAS) in the semi-autonomous vehicle. Using the ADAS, the vehicle may confirm that the operator's actions are correct.

These systems may be improved by predicting future actions through more sources of input and/or embedded sensors. The additional sources of input may focus on the operator's position in the vehicle, such as controlling steering, braking, acceleration, and so on. The correctness of the data may rely on various sensors throughout the vehicle, including wearable sensors that are communicatively coupled with the operator. For example, some embodiments can electronically or mechanically "switch" a vehicle's acceleration and brake pedals when the driver is predicted to actuate the wrong pedal in response to some road condition, obstacle, etc. In another example, some embodiments may effectively deactivate a particular vehicle pedal. These and other illustrative examples may be implemented through the use of one or more sensors.

In particular, switching a vehicle's acceleration and brake pedals or deactivating a particular pedal may be implemented with the help of a smart shoe device in communication with the vehicle. The smart shoe device may transmit and receive communications with the vehicle, including data generated by accelerometers, gyroscopes, position sensors (e.g., GPS), and so on that are embedded with the smart shoe device. The vehicle system may analyze the data generated by the smart shoe device to determine current actions or predict future actions performed by the operator wearing the smart shoe device. The smart shoe device may also provide output to the operator, including sensations identifying predicted vehicle events (e.g., tightening or loosening of the footwear, vibration, haptic feedback, temperature change, etc.). Actual or predictive movements of the smart shoe device may be determined using past or current movement data of the smart shoe device and, for example, modeling to predict future actions. Other types of smart devices may be incorporated without diverting from the essence of the disclosure.

Using the smart shoe device, a vehicle's acceleration and brake pedals may be switched. For example, the vehicle may operate in a semi-autonomous mode and receive manual commands from an operator. At the same time, the vehicle may determine the correct action to take according to various systems, including vehicle state information, driver state information, navigation information, advanced driver assistance system (ADAS) information, and so on. The smart shoe device may include a sensor embedded in the shoe that interacts with a sensor by the pedal of the vehicle to sense the shoe's location before the pedal is pressed (e.g., RF sensor in the pedal, inductive coils on the pedal or floor, etc.). In some examples, the sensor may be associated with the vehicle in general, not limited to the location or association with the pedal. When the smart shoe device is within a threshold distance of a particular pedal and is likely to press it (e.g., based on a trained ML model or other past data), the vehicle compares that action with the action previously determined by the autonomous or semi-autonomous system and determines the shoe's imminent action is not the "correct action" determined by the various vehicle systems. In response, the vehicle switches the pedal either electronically or mechanically so that the operator of the semi-autonomous vehicle presses the correct pedal corresponding with the correct action.

Using the smart shoe device, a vehicle's acceleration or brake pedal may be deactivated or disabled. For example, the vehicle may operate in a semi-autonomous mode and receive manual commands from an operator. At the same time, the vehicle may determine the correct action to take according to various systems, including vehicle state information, driver state information, navigation information, ADAS information, and so on. The smart shoe device may include a sensor embedded in the shoe that interacts with a sensor by the pedal of the vehicle to sense an amount of pressure applied to the pedal once it is pressed (e.g., piezometer, inductive coils on the pedal or floor, etc.). When the smart shoe device presses the pedal a predetermined threshold amount, the vehicle compares that action with the action previously determined by the autonomous or semi-autonomous system and determines the shoe's pressed pedal is not the "correct action" for that pedal determined by the various vehicle systems. In response, the vehicle deactivates or disables the pedal and initiates a fully autonomous mode to take over operation of the vehicle from the operator.

Movements of the smart shoe device may also help operate the vehicle. For example, the smart shoe device may apply pressure to a pedal of the vehicle to effectuate acceleration or braking. The operator wearing the smart shoe device may perform other standard actions with vehicle, including turning a steering wheel of the vehicle to move left and right that are unrelated to the smart shoe device. The actions performed by the operator and/or smart shoe device may be recorded and transmitted to a data store associated with the vehicle (e.g., in the cloud, at the vehicle, or remote computing system).

Other data may be generated, stored, and analyzed as well. For example, the operation of the vehicle, either assisted by the operator (in a semi-autonomous driving mode) or unassisted (in an autonomous or semi-autonomous driving mode), may be detected by sensors within the vehicle (e.g., within the cabin of the vehicle, the floorboard next to the accelerator or brake pedal, etc.). As described herein, this may include navigation data (e.g., a route between two locations, etc.), vehicle state data (e.g., warning systems, operations or orientation of the vehicle, etc.), driver state data (e.g., via sensors that identify eye or body movements, location of occupants in the vehicle, etc.), and advanced driver assistance system (ADAS) data (e.g., data when a vehicle system switched from semi-autonomous to autonomous, exceeds a particular threshold, etc.).

Various embodiments may implement systems and processes that determine and analyze data generated by the smart shoe device, vehicle, or other related systems. For example, embodiments of the application may assist with correcting a vehicle response from an improperly pressed pedal. The system may analyze data associated with the sensors and smart shoe device to determine an improper action performed by the operator (or predicted to perform) and an action performed (or predicted to perform) by the vehicle in response. In some embodiments, the system may deactivate or disable the accelerator or brake pedal according to improper operator actions (e.g., to avoid a collision, etc.). In some embodiments, the system may switch the accelerator pedal with the brake pedal, or vice versa, according to data that predicts a future pressing of the pedal by the operator and an improper vehicle action that results. The switching of the accelerator pedal with the brake pedal, or vice versa, may be implemented logically in a virtualized system by replacing the digitized location of the pedal on a graphical user interface or physically by mechanically moving the position of each pedal.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials, or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous or semi-autonomous vehicle. Vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 2 may be implemented as a "traditional" vehicle with an internal combustion engine and the like, or as a hybrid electric vehicle without diverting from the scope of the disclosure. As a hybrid electric vehicle (HEV), vehicle 2 may be driven/powered with either or both of engine 14 and the motor(s) 22 as the drive source for travel. For example, a first travel mode may be an engine-only travel mode that only uses engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump, and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from engine 14. For example, an alternator or generator may be coupled directly or indirectly to a drive shaft of engine 14 to generate an electrical current as a result of the operation of engine 14. A clutch can be included to engage/disengage the battery charger 45. Battery 44 may also be charged by motor(s) 22 such as, for example, by regenerative braking or by coasting during which time motor(s) 22 operate as generator.

Motor(s) 22 can be powered by battery 44 to generate a motive force to move the vehicle and adjust vehicle speed. Motor(s) 22 can also function as a generator to generate electrical power such as, for example, when coasting or braking. Battery 44 may also be used to power other electrical or electronic systems in the vehicle. Motor(s) 22 may be connected to battery 44 via an inverter 42. Battery 44 can include, for example, one or more batteries, capacitive storage units, or other storage reservoirs suitable for storing electrical energy that can be used to power motor(s) 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described further below) may be included and may control the electric drive components of the vehicle as well as other vehicle components. For example, electronic control unit 50 may control inverter 42, adjust driving current supplied to motor(s) 22, and adjust the current received from motor(s) 22 during regenerative coasting and breaking. As a more particular example, output torque of the motor(s) 22 can be increased or decreased by electronic control unit 50 through the inverter 42.

A torque converter 16 can be included to control the application of power from engine 14 and motor(s) 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to motor(s) 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit 40 (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50 execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control unit 50 can be configured to control systems and functions such as door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors 52 included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor(s) 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to electronic control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

Figure 2:
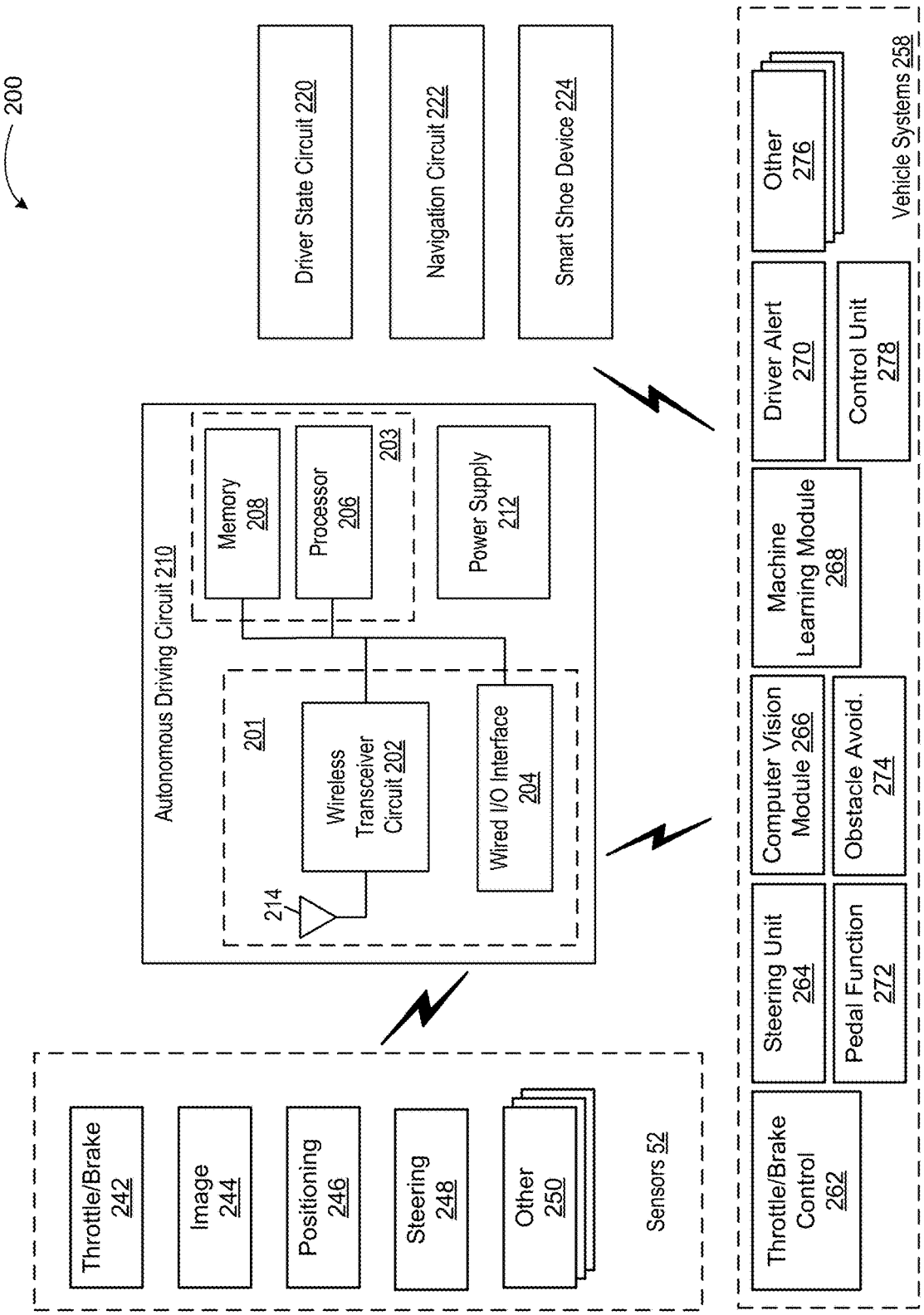
FIG. 2 illustrates an example architecture for vehicle operation with which embodiments of the disclosed technology may be implemented.

Additional detail about vehicle 2 is illustrated in FIG. 2. FIG. 2 illustrates an example architecture for vehicle operation with smart shoe device input. In this example, smart shoe device detection and operation system 200 includes an autonomous driving circuit 210, driver state circuit 220, navigation circuit 222, smart shoe device 224, a plurality of sensors 52, and a plurality of vehicle systems 258. The detail provided herein is for illustrative purposes and should not be used to limit the disclosure.

Sensors 52 and vehicle systems 258 can communicate with autonomous driving circuit 210 via a wired or wireless communication interface. Although sensors 52 and vehicle systems 258 are depicted as communicating with autonomous driving circuit 210, they can also communicate with each other as well as with other vehicle systems. Autonomous driving circuit 210 can be implemented as an ECU or as part of an ECU such as, for example electronic control unit 50. In other embodiments, autonomous driving circuit 210 can be implemented independently of the ECU 50.

Autonomous driving circuit 210 in this example includes a communication circuit 201, a decision circuit 203 (including a processor 206 and memory 208 in this example), and a power supply 212. Components of autonomous driving circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to autonomous driving circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up autonomous driving circuit 210.

Communication circuit 201 either or both a wireless transceiver circuit 202 with an associated antenna 214 and a wired I/O interface 204 with an associated hardwired data port (not illustrated). As this example illustrates, communications with autonomous driving circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by autonomous driving circuit 210 to/from other entities, such as driver state circuit 220, navigation circuit 222, wearable vehicle operating device circuit 224, sensors 52, and vehicle systems 258.

Wired I/O interface 204 can include a transmitter and a receiver (not shown) for hardwired communications with other devices. For example, wired I/O interface 204 can provide a hardwired interface to other components, including sensors 52 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 52 can include, for example, sensors 52 such as those described above with reference to the example of FIG. 1. Sensors 52 can include additional sensors that may or may not otherwise be included on a standard vehicle 10 with which smart shoe device detection and operation system 200 is implemented. Sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additional sensors 276 can also be included as may be appropriate for a given implementation of smart shoe device detection and operation system 200.

Sensors 52 may be included to detect not only vehicle conditions but also to detect external conditions as well. Sensors that might be used to detect external conditions can include, for example, sonar, radar, Laser Imaging Detection and Ranging (LIDAR), or other vehicle proximity or distance measurement sensors, cameras or other image sensors, throttle and brake sensors, accelerometers, steering sensors, and a vehicle positioning system (GPS).

Throttle and brake sensors 242 are configured to gather data regarding throttle and brake application by a human or autonomous operator. Throttle and brake sensors 242 may also detect when the throttle or brake application is received by smart shoe device 224 (e.g., based on proximity sensors detected between the pedal and smart shoe device 224, etc.). Throttle and brake sensors 242 may be embedded within the pedal, located next to the pedal (e.g., in the footwell of the vehicle, etc.), or incorporated at a location that is communicatively coupled yet not physically attached to the pedal.

Throttle and brake sensors 242 may be configured as X-By-Wire (XBW) where the actual control of the vehicle is initially supported by electronically assisted control without eliminating the mechanical control for the operator. XBW may be initiated on-demand (e.g., by a trigger from one or more vehicle systems 258 or smart shoe device 224.

Throttle and brake sensors 242 are configured to detect a stroke amount of an accelerator pedal, for example, a pedal position of the accelerator pedal with respect to a reference position. The reference position may be a fixed position or a variable position depending on a determined parameter.

The accelerator pedal sensor is provided to a shaft portion of the accelerator pedal AP of vehicle 2, for example. The accelerator pedal sensor outputs, to ECU 50, operation information reflecting the stroke amount of the accelerator pedal.

Throttle and brake sensors 242 are configured to detect a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to ECU 50, operation information reflecting the stroke amount or the operation force of the brake pedal.

Throttle and brake sensors 242 are configured to detect an acceleration or slowing of vehicle 2. For example, throttle and brake sensors 242 may include a longitudinal acceleration sensor for detecting a longitudinal acceleration of vehicle 2, and a lateral acceleration sensor for detecting a lateral acceleration of vehicle 2. Throttle and brake sensors 242 outputs, to the ECU 50, acceleration information.

Image sensors 244 can be used to actively detect passive environmental objects or detect active objects (e.g., objects used to implement smart roadways) that may actively transmit and/or receive data or other information. Image sensors 244 can include one or more cameras or other image sensors to capture images of the environment around the vehicle as well as internal to the vehicle. Information from image sensors 244 can be used to determine information about the environment surrounding the vehicle 2 including, for example, information regarding other objects surrounding vehicle 2. For example, image sensors 244 may be able to recognize landmarks or other features (e.g., street signs, traffic lights, etc.), slope of the road, lines on the road, curbs, objects to be avoided (e.g., other vehicles, pedestrians, bicyclists, etc.) and other landmarks or features. Information from image sensors can be used in conjunction with other information such as map data or information from positioning system to determine, refined or verify vehicle location.

In some examples, image sensors 244 are embedded on a back side of a front windshield of vehicle 2. Image sensors 244 may be, for example, a monocular camera or a stereo camera. Image sensors 244 outputs, to the ECU 50, image information on the external circumstances surrounding vehicle 2. Image sensors 244 is not limited to a visible light wavelength camera, but can be an infrared camera. Image sensors 244 may be implemented as radar (e.g., to detect obstacles outside of vehicle 2 by transmitting radio waves to the surroundings of the vehicle and receive reflected radio waves from an obstacle to detect the obstacle, etc.) or LIDAR (e.g., similar to the manner in which the radar unit operates except that light is used in place of radio waves to detect obstacles outside of vehicle 2, etc.).

Distance measuring, vehicle positioning, or global positioning system (GPS) sensors 246 such as lidar, radar, infrared (IR) sensors, and other like sensors can be used to gather data to measure distances and closing rates to various external objects such as other vehicles, traffic signs, pedestrians, light poles, and other objects. Vehicle positioning system 246 (e.g., GPS or other positioning system) can be used to gather position information about a current location of the vehicle as well as other positioning or navigation information.

Steering sensor 248 is configured to gather data regarding steering input for the vehicle 2 by a human or autonomous operator. Data generated by steering sensor 248 may be compared with a correct action determined by navigation circuit 222 or other vehicle system 258.

Other sensors 250 may be used to provide input to vehicle systems 258 or other systems of vehicle 2 so that the systems have information useful to operate in an autonomous, semi-autonomous, or manual mode. For example, other sensors 250 may detect a speed of vehicle 2 or other operating conditions. These other sensors 250 may include combining data from a plurality of sensors to execute algorithms and assess inputs from the various sensors 52.

Throttle/brake control unit 262 can be used to control actuation of throttle and braking mechanisms detected by throttle and brake sensors 242 of the vehicle 2 to accelerate, slow down, stop, or otherwise adjust the speed of the vehicle. For example, the throttle of throttle/brake control unit 262 can control the operating speed of the engine or motor used to provide motive power for the vehicle. Likewise, the brake unit of throttle/brake control unit 262 can be used to actuate brakes (e.g., disk, drum, etc.) or engage regenerative braking (e.g., such as in a hybrid or electric vehicle) to slow or stop the vehicle.

Steering unit 264 may include any of a number of different mechanisms to control or alter the heading of the vehicle. For example, steering unit 264 may include the appropriate control mechanisms to adjust the orientation of the front or rear wheels of the vehicle to accomplish changes in direction of the vehicle during operation. In conjunction with throttle/brake control unit 262, steering unit 264 can adjust the direction and speed of the vehicle in response to an improper command from an operator or predicted action from smart shoe device 224. Electronic, hydraulic, mechanical or other steering mechanisms may be controlled by steering unit 264.

Computer vision module 266 may be included to process image data (e.g., image data captured from image sensors 244 or other image data) to evaluate the environment within or surrounding the vehicle. For example, algorithms operating as part of computer vision module 266 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle), and other objects. The system can include video tracking and other algorithms to recognize objects such as the foregoing, estimate their speed, map the surroundings, and so on.

Machine learning module 268 is configured to receive inputs (e.g., sensor data, proximity data between smart shoe device and pedal sensor, etc.) and generate outputs (e.g., likelihood of performing an operation using vehicle 2, etc.). Machine learning module 268 may implement one or more trained machine learning models or other models that predict a particular output based on a set of inputs. In some examples, machine learning module 268 may be configured to determine a likely future action to be performed by the operator by analyzing past operations of the operator as determinations of performing the same future action out of habit. In some examples, machine learning module 268 may be configured to determine a correct future action based on identified obstacles determined by obstacle avoidance module 274, future navigation determined by navigation circuit 222, or future throttle/brake operations to be performed by the operator.

Output from machine learning module 268 may trigger operation of other vehicle systems 258. For example, if a future action involves changing a lane or other course of action, machine learning module 268 may trigger operation of turn signals, flashing lights, and the like. In another example, if a future action involves applying pressure to a brake pedal, machine learning module 268 may trigger operation of the brake or hazard lights.

Driver alert 270 is configured to update a user interface of an automated vehicle operation. This may include updating a user interface to inform the operator that the vehicle has replaced a digitized location of the pedal on a user interface or physically moved a position of each pedal. In some examples, driver alert 270 is configured to communicate with smart shoe device 224 to provide feedback output to the operator, including sensations implemented by smart shoe device 224 (e.g., tightening or loosening of the footwear, vibration, haptic feedback, temperature change, etc.).

Pedal function 272 is configured to deactivate or disable a pedal based on data from sensors 52 or output from machine learning module 268. For example, smart shoe device 224 may press accelerator pedal and throttle and brake sensors 242 may detect the pressure applied to the pedal. Machine learning module 268 may identify that the correct action to perform is applying the brake pedal rather than the accelerator pedal. In response to the detection and ML output, pedal function 272 may deactivate or disable the accelerator pedal. With the pedal deactivated or disabled, an automated operation of the vehicle may be implemented (e.g., via advanced driver assistance systems (ADAS) technologies or other automated system).

Pedal function 272 is configured to adjust a function of a pedal based on data from sensors 52 or output from machine learning module 268. For example, smart shoe device 224 may press accelerator pedal and throttle and brake sensors 242 may detect the pressure applied to the pedal. Machine learning module 268 may identify that the correct action to perform is applying the brake pedal rather than the accelerator pedal. In response to the detection and ML output, pedal function 272 may switch the pedal function associated with the accelerator pedal to a function commonly associated with the brake pedal (e.g., slowing down vehicle 2, etc.). This may include switching the functionality of the accelerator or throttle pedal with the functionality of the brake pedal. When the accelerator pedal continues to be pressed, the accelerator pedal may slow down the vehicle instead of increase acceleration of the vehicle.

Pedal function 272 is configured to correlate an intended operation with an instructed operation of the accelerator pedal or the brake pedal. For example, machine learning module 268 may identify that a future action to be performed by smart shoe device 224 associated with a particular operator in a particular environment is to press a brake pedal. When the received operation is pressing the accelerator pedal, pedal function 272 may switch the operation of the pressed pedal with the intended pedal. In some examples, switching the operation of a pedal may be confirmed by safety precautions, obstacle avoidance, and other factors.

Obstacle avoidance module 274 is configured to determine control inputs necessary to avoid obstacles detected by sensors 52 or other vehicle systems 258. Obstacle avoidance system 274 can work in conjunction with navigation circuit 222 to determine an appropriate path to avoid a detected obstacle.

Obstacle avoidance module 274 is configured to recognize or assess the environment surrounding or neighboring vehicle 2 based on the information obtained by sensors 52, navigation circuit 222, and/or smart shoe device 224. Obstacle avoidance module 274 may recognize, based on the information obtained by sensors 52, obstacles surrounding vehicle 2, including moving objects such as pedestrians, other vehicles, motorcycles, and bicycles and stationary objects such as a road lane boundary (white line, yellow line), a curb, a guard rail, poles, a median strip, buildings and trees. Obstacle avoidance module 274 obtains information regarding a distance between the obstacle and the vehicle, a position of the obstacle, a direction, a relative velocity, a relative acceleration of the obstacle with respect to the vehicle, and a category and attribution of the obstacle.

Other vehicle systems 276 may be implemented as well, including transmission, electronic control unit (ECU) 50, and propulsion system. These vehicle systems may be controlled in autonomous, semi-autonomous, or manual mode. For example, in autonomous or semi-autonomous mode, AV control systems 130, alone or in conjunction with other systems, can control other vehicle systems 276 to operate the vehicle in a fully or semi-autonomous fashion. This may also include an assist mode in which the vehicle takes over partial control or activates ADAS controls to assist the driver with vehicle operation.

Vehicle 2 may also include a wireless communication system (not illustrated) to communicate with other vehicles, infrastructure elements, cloud components, and other external entities using any of a number of communication protocols including, for example, V2V, V2I and V2X protocols. Such a wireless communication system may allow vehicle 2 to receive information from other objects including, for example, map data, data regarding infrastructure elements, data regarding operation and intention of surrounding vehicles, and so on. A wireless communication system may also allow vehicle 2 to transmit information to other objects. In some applications, computing functions for various embodiments disclosed herein may be performed entirely on vehicle 2, distributed among two or more vehicle systems 258 of vehicle, performed on a cloud-based platform, performed on an edge-based platform, or performed on a combination of the foregoing.

The examples of FIGS. 1-2 are provided for illustration purposes only as examples of vehicle systems with which embodiments of the disclosed technology may be implemented. One of ordinary skill in the art reading this description will understand how the disclosed embodiments can be implemented with this and other vehicle platforms.

Autonomous driving circuit 210, sensors 52, and vehicle systems 258 may communicate with driver state circuit 220, navigation circuit 222, and smart shoe device 224 to further adjust operations of vehicle 2.

Driver state circuit 220 can detect an operator state of vehicle 2 via sensors that identify eye or body movements, location of occupants in the vehicle, etc. For example, driver state circuit 220 may include a camera that can take an image of the driver, where the image can be used for estimating the degree to which the driver's eyes are open, the direction of the driver's gaze, whether or not the driver is holding the steering wheel, etc. Driver state circuit 220 may include be a pressure sensor for detecting the amount of pressure the driver's hand(s) are applying to the steering wheel.

Driver state circuit 220 may be configured to determine a manual driving preparation state of the driver. More specifically, driver state circuit 220 can check, for example, whether or not the driver is ready to start manual operation of vehicle 2. Moreover, driver state circuit 220 can check, for example, whether or not the driver has some intention of accelerating or applying brakes to vehicle 2.

Navigation circuit 222 (e.g., Global Positioning System (GPS), or other positioning system, etc.) can be a component or series of interoperating components that guides the driver of vehicle 2 to a destination on a map designated by the driver of vehicle 2. For example, navigation circuit 222 may receive signals from three or more GPS satellites to obtain position information indicating a position of vehicle 2. Navigation circuit 222 may output the measured position information of the vehicle to ECU 50.

Navigation circuit 222 is configured to calculate a route followed or to be followed by vehicle 2, based on the position information of vehicle 2 measured by positioning sensor 246 and map information of a local or remote map database. The route may indicate a running lane of a section(s) of roadway in which vehicle 2 traverses, for example. Navigation circuit 222 calculates a target route from the current position of vehicle 2 to the destination, and notifies the driver of the target route through a display, e.g., a display integrated with vehicle 2 and/or via audio through a speaker(s) for example. Navigation circuit 222 outputs, to the ECU 50, information of the target route for vehicle 2. In some embodiments, navigation circuit 222 may use information stored in a remote database, like a map database, and/or some information processing center with which vehicle 2 can communicate. A part of the processing executed by navigation circuit 222 may be executed remotely as well.

A map database may be a database including map information. The map database is implemented, for example, in a disk drive or other memory installed in vehicle 2. The map information may include road position information, road shape information, intersection position information, and fork position information, for example. The road shape information may include information regarding a road type such as a curve and a straight line, and a curvature angle of the curve. When smart shoe device detection and operation system 200 uses a Simultaneous Localization and Mapping (SLAM) technology or position information of blocking structural objects such as buildings and walls, the map information may further include an output signal from one or more sensors 52. In some embodiments, map database may be a remote data base or repository with which vehicle 2 communicates.

In some scenarios, switching from autonomous control to semi-autonomous or manual driving may be executed. Whether or not to execute this switch from autonomous control to semi-autonomous or manual driving may be determined based on a comparison between a correct operation (e.g., determined by machine learning module 268) and an actual operation (e.g., determined by one or more sensors 52), or a comparison between a correct operation and a predicted operation (e.g., determined by medal function 272, obstacle avoidance module 274). Either of these comparisons may be quantified by comparing differences between the correct/predicted/actual actions with a threshold or pattern. For example, when the action is equal to or more than the threshold, the smart shoe device detection and operation system 200 executes the switch from a manual control mode to an autonomous or semi-autonomous driving mode. In another example, when the action matches a pattern (e.g., pattern of locations, movements, acceleration, velocity, etc. of smart shoe device), the smart shoe device detection and operation system 200 executes the switch from a manual control mode to an autonomous or semi-autonomous driving mode. Smart shoe device detection and operation system 200 may take over operation, effecting a switch from manual driving/control to autonomous control. As will be discussed in greater detail below, smart shoe device detection and operation system 200 may make certain determinations regarding whether to comply or proceed with autonomous control based on a command from smart shoe device detection and operation system 200. For example, considerations regarding recoverability and vehicle control under certain conditions may be considered as factors in determining whether or not autonomous control can be safely executed. Such considerations may also be reflected as thresholds or patterns for comparison.

For example, when an operation amount of any of a steering operation, an acceleration operation, and brake operation by the driver of vehicle 2 during the autonomous driving control becomes equal to or more than a threshold (or matches a pattern, etc.), smart shoe device detection and operation system 200 may execute a switch from autonomous control to semi-autonomous or manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while smart shoe device detection and operation system 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

Smart shoe device 224 can include footwear, shoe, or any other article of clothing that may be embedded with an electronic device. Smart shoe device 224 may be a wearable electronic device that is worn on an operator's foot. During operation, smart shoe device 224 can receive information from various sensors 52 or vehicle systems 258 to determine vehicle operations. Smart shoe device 224 is configured to provide output or other communicating information between a passenger(s) (including the operator) of vehicle 2 and smart shoe device detection and operation system 200. For example, smart shoe device 224 may include sensors or actuators to tighten or loosen the footwear, vibration, haptic feedback, temperature change, and the like. Smart shoe device 224 may also or alternatively transmit the information to the passenger(s) through an interface or other information terminal connected wirelessly and receive the input operation by the passenger(s) through the mobile information terminal.

Figure 3:
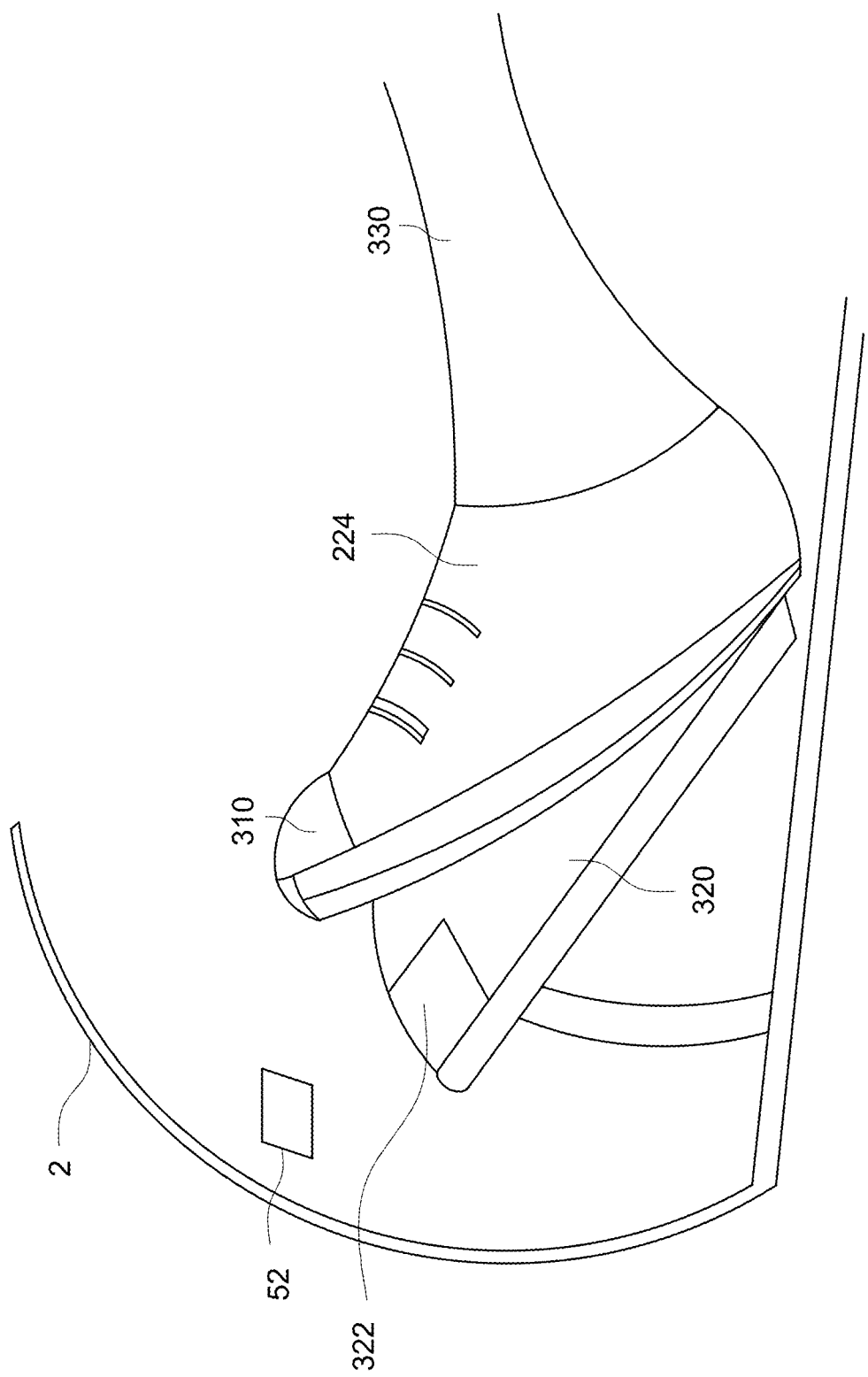
FIG. 3 illustrates an example smart shoe device for vehicle operation with which embodiments of the disclosed technology may be implemented.

Additional detail of smart shoe device 224 is provided with FIG. 3. In a representative implementation, smart shoe device 224 includes a shoe structure, such as a footwear upper mounted onto a sole structure, for surrounding a foot of operator 330. Various communication systems may be mounted on or in smart shoe device 224 to generate visible, audible, and/or haptic outputs responsive to electronic command signals.

In some examples, smart shoe device 224 is equipped with an active or passive system for communication. For example, in an active communication embodiment, smart shoe device 224 is equipped with a wireless communications device operable to wirelessly communicate with a mobile device or vehicle system 258 of vehicle 2. In a passive communication embodiment, smart shoe device 224 is equipped with shoe sensor 310. Shoe sensor 310 may correspond with a radio frequency (RF) transponder or similar sensor, to broadcast and receive signals from components of vehicle 2. Shoe sensor 310 may be discoverable in a passive system (e.g., no energy required) like a Radio Frequency Identification (RFID) chip or another "trackable" wireless technology.

Smart shoe device 224 (via the transponder) may detect one or more vehicle sensors 52 or a transmitter-detector pedal sensor 322 mounted on pedal 320 using shoe sensor 310. The location of smart shoe device 224 may be determined relative to vehicle 2 using the detected distance between vehicle sensors 52 or transmitter-detector pedal sensor 322 and smart shoe device 224.

The distance between shoe sensor 310 and pedal sensor 322 may be compared to a threshold value or pattern. The distance may correlate with a three-dimensional (3D) environment where the distance can be measured along any of a plurality of planes. When the distance is less than the threshold value or matches a pattern (e.g., of locations, movements, velocity, acceleration, or the like over time, etc.), the vehicle system may determine that the smart shoe device 224 is likely to press pedal 320 due to its proximity. In some examples, the threshold or pattern may be adjustable based on a user profile corresponding with the smart shoe device 224 such that the distance is learned from past actions to determine the likelihood that operator 330 will press the pedal 320.

In some examples, shoe sensor 310 may measure velocity and/or acceleration of smart shoe device 224. The velocity may be measured by both magnitude and direction, such that the rate of change of shoe sensor 310 is measured from its position from pedal sensor 322 or other sensor associated with vehicle 2. The velocity may be measured as a function of time to determine the speed and direction of motion of smart shoe device 224 (e.g., 0.5 cm/second away from pedal sensor 322, etc.). The acceleration may be measured by both magnitude and direction with respect to pedal sensor 322 or other sensor associated with vehicle 2.

Other locations for vehicle sensors 52 may be implemented as well. For example, vehicle sensor 52 or a transmitter-detector pedal sensor 322 may be embedded within a vehicle wall in a front passenger compartment of vehicle 2 (e.g., in the footwell, etc.). The illustrated example should not be interpreted as limiting the scope of the technology to the front passenger compartment, and a person of ordinary skill in the art would understand how to implement the embodiments in different seating areas (e.g., driver's seat, rear passenger seat, etc.).

Shoe sensor 310 may detect other data of smart shoe device 224 as well. For example, in addition or instead of predicting future actions that are likely to be performed by smart shoe device 224, shoe sensor 310 may detect actual actions performed by smart shoe device 224. This may include any pressure applied to pedal 320 or other vehicle component (e.g., floorboard, footwell, etc.) that may be detected based on a pressure sensor (e.g., piezometer, etc.). The location, velocity, and/or acceleration of smart shoe device 224 may be determined as well. This may help identify a pressure applied to the brake or throttle pedals, yet measured from shoe sensor 310 of the smart shoe device 224 rather than the pressure received by the pedal.

Sensor data generated by shoe sensor 310 may be used to update user profile of operator 320. The speed, acceleration, pressure, and the like may be correlated to other vehicle systems 258, driver state circuit 220, navigation circuit 222, and the like. The environment experienced by operator 330 and the action performed by operator 330 may be added to the user profile to help generate more accurate predictions of future actions performed by the operator in similar environments and scenarios.

Smart shoe device 224 may be charged. For example, an inductive coil may be implemented with pedal 320. When smart shoe device 224 comes in contact with the inductive coil, the inductive coil may provide a wireless power transfer using electromagnetic induction to provide electricity to smart shoe device 224.

Obstacle avoidance (e.g., implemented by obstacle avoidance module 274 illustrated in FIG. 2) can be further enhanced. For example, the distance between shoe sensor 310 and pedal sensor 322 may estimate the reaction time of operator 330 when responding to an obstacle. The estimated reaction time may be based at least in part on the amount of movement required to move smart shoe device 224 from its current location to the pedal 320 and apply pressure to the pedal 320 to perform the correct action (e.g., in accordance with the output determined by machine learning module 268, etc.). In some examples, the estimated reaction time may be adjusted in accordance with the user profile associated with smart shoe device 224 or operator 330, and/or past actions and corresponding reaction times.

In some examples, airbag control may be altered based on the location of smart shoe device 224 and/or operator 330 relative to one or more sensors 52 in vehicle 2. For example, when operator 330 is detected at an off-center location from the steering wheel (e.g., by the distance between shoe sensor 310 and pedal sensor 322, the position of smart shoe device 224 with respect to pedal 320, as detected by image sensors, etc.), the airbag control system may decrease the pressure of the airbag next to the operator while increasing the pressure of the airbag at a further distance from operator 330. This may help avoid injury caused by deploying airbags when the operator is in a sub-optimal position in the front passenger compartment. Additional information associated with the positioning of operator with respect to the airbag system is provided with FIG. 4.

In some examples, the location of operator 330 may be inferred based on the location, orientation, angle, and/or position of smart shoe device 224 (e.g., determined by accelerator, gyroscope, or other sensor in smart shoe device 224, etc.). The location of operator 330 may be determined relative to vehicle sensors in the vehicle. The position of the foot that wears smart shoe device 224 (and corresponding leg, body, etc.) may be determined based on data generated by smart shoe device 224.

Other obstacle avoidance operations may be enhanced by automating an audible, visible, and/or tactile warning to operator 330 via smart shoe device 224 or other interface incorporated with vehicle 2. For example, smart shoe device 224 may include one or more sensors embedded within the shoe to tighten or loosen of the footwear, provide a vibration, provide haptic feedback, or change the temperature for the wearer. Other audible or visible warnings may be provided by vehicle 2 to other vehicles to identify the future action prior to it being performed by operator 330 via smart shoe device 224 (e.g., activating hazard lights, turn signals, brake lights, horn, etc.).

Communications between pedal 320 and smart shoe device 224 may comprise user profile information, including an identifier of smart shoe device 224. The identifier may be authenticated with an approved user profile to confirm allowable operation of vehicle 2. User profile may correspond with past actions performed by operator 330 with respect to vehicle 2 or other sensor data received by vehicle systems while vehicle is being operated by operator 330.

Functionality of vehicle 2 may be limited based on the authentication of smart shoe device 224. For example, a new student driver may correspond with a particular identifier of smart shoe device 224. Speed, distance traveled, or other operability of vehicle 2 may be limited based on the smart shoe device 224 identified. Notifications may be transmitted to a cloud or other central server to identify the location of smart shoe device 224 based on this authentication as well.

Using communications between vehicle 2 and smart shoe device 224, vehicle may adjust pedal functionality or other operational controls of vehicle 2, such as acceleration, deceleration, steering of a vehicle, and/or other movement of the vehicle, without depending or relying on driving operations/directions by an operator of vehicle 2. That is, the acceleration, slowing, or stopping of vehicle 2 is automatically operated/controlled such that vehicle 2 operates in accordance with an automated driving system rather than manual operation (e.g., to avoid an obstacle, etc.) even when the operator performs a different action or no action at all.

In some scenarios, switching from manual driving to autonomous control may be executed. Whether or not to execute this switch between these modes may be determined based on a comparison between a comparison target and a threshold or pattern. In one embodiment, the comparison target is quantified so as to be compared with the threshold or pattern. When the comparison target is equal to or more than the threshold or pattern, the smart shoe device detection and operation system 200 executes the switch from a manual driving mode to an autonomous control mode. Considerations regarding recoverability and vehicle control under certain conditions may be considered as factors in determining whether or not autonomous control can be safely executed. Such considerations may also be reflected as thresholds or patterns for comparison.

For example, when an operation amount of any of a throttle or braking operation by the operator of vehicle 2 during the autonomous driving control becomes equal to or more than a threshold or matches a pattern of operations (e.g., based on location, acceleration, velocity, orientation, movements, etc.), smart shoe device detection and operation system 200 may execute a switch from manual control to autonomous control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

Returning to FIG. 2, control unit 278 operatively interacts with sensors 52 and other vehicle systems 258 to determine whether or not smart shoe device detection and operation system 200 (in particular, control unit 278) can engage (activate, start) in autonomous control of vehicle 2. For example, a threshold condition may be compared with a difference between a predicted future action (e.g., pressing of a throttle or brake pedal) and a correct action that the operator should perform in manual driving mode (e.g., as determined by a machine learning model 268, obstacle avoidance 274, etc.).

Control unit 278 may also be configured to alter operation of pedals in vehicle 2. For example, a first threshold condition may be compared with a difference between a predicted future action of pressing the brake pedal and whether applying the brake pedal is the correct action that the operator should perform in manual driving mode. In another example, a second threshold condition may be compared with a difference between a predicted future action of pressing an acceleration pedal and whether applying the acceleration pedal is the correct action that the operator should perform in manual driving mode.

Control unit 278 may further determine whether or not a trigger to deactivate (stop) an autonomous control mode, or altering the operation of pedals (e.g., switching the throttle pedal to a brake pedal and vice versa, etc.).

Figure 4:
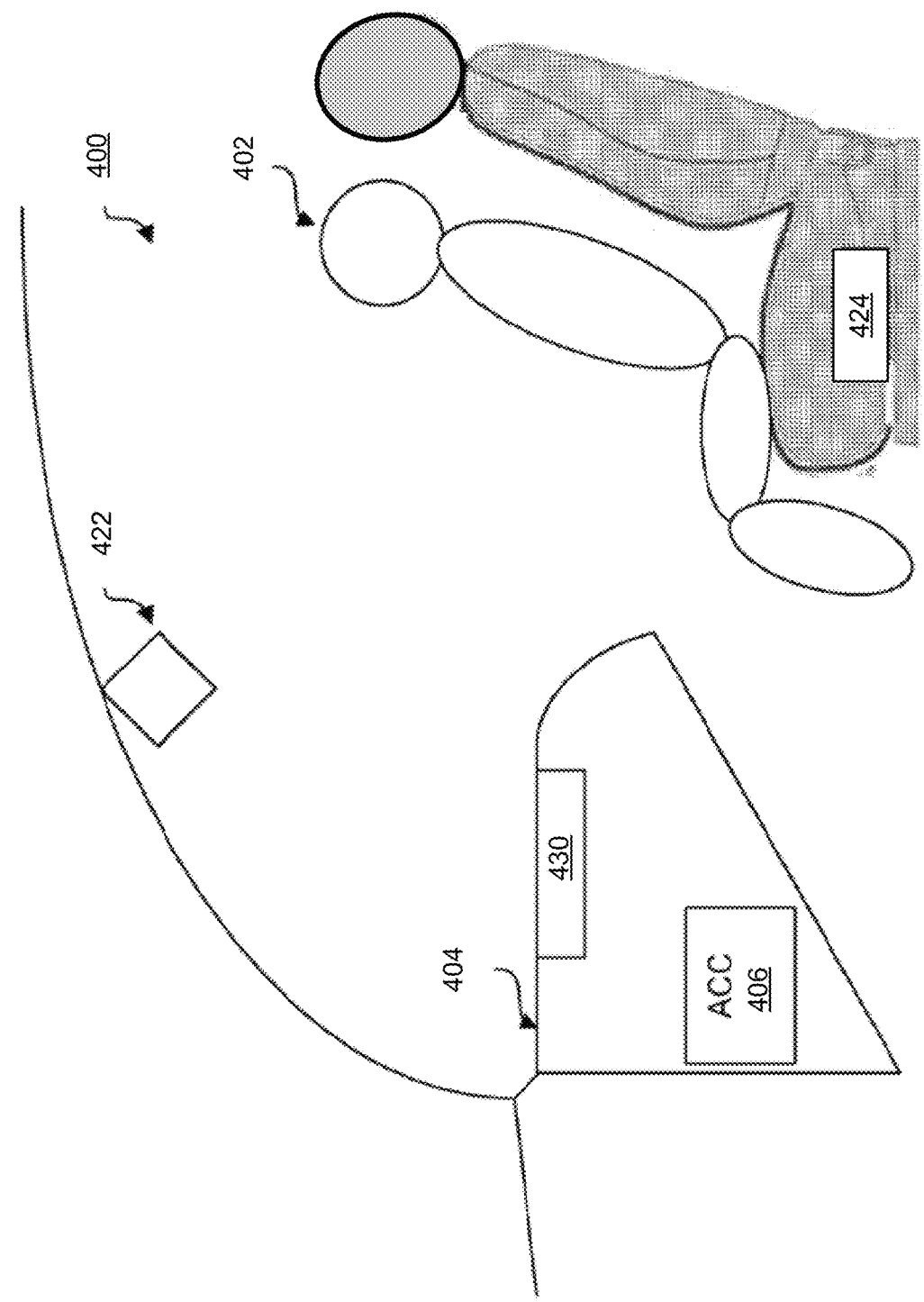
FIG. 4 illustrates various sensors in a vehicle that may generate data for predicting a future action with which embodiments of the disclosed technology may be implemented.

FIG. 4 illustrates various sensors in a vehicle that may generate data for predicting a future action with which embodiments of the disclosed technology may be implemented. Front passenger compartment 400 is illustrated as a cross-sectional view of vehicle 2. The illustrated example should not be interpreted as limiting the scope of the technology to the front passenger compartment, and a person of ordinary skill in the art would understand how to implement the embodiments in different seating areas (e.g., driver's seat, rear passenger seat, etc.).

Front passenger compartment 400 includes image sensor 422. Image sensor 422 is designed and configured to track the head position of one or more occupants of the vehicle by, for example, using eye-tracking technology. In some embodiments, image sensor 422 may determine the position of the occupant's head through comparing video frames and predictive imaging. A person of ordinary skill in the art would understand that the image sensor 422 may be any sensor component capable of tracking motion, and the examples recited above should not be interpreted as limiting the scope of the technology to only those examples.

Image sensor 422 may be centrally located within passenger compartment 400 and in front of the occupant 402. In various embodiments, image sensor 422 may be attached to the rear view mirror of the vehicle, or built into the rear view mirror. In some embodiments, image sensor 422 may be affixed to the roof line across the front windshield. Image sensor 422 may be positioned on a section of a dashboard 404 and positioned to face the occupant and monitor the occupant's head position. In various embodiments, a single image sensor 422 may be used to monitor the head position of all occupants in the front passage compartment 400, the rear passenger compartment (not shown), or both. In other embodiments, more than one image sensor 422 may be used to monitor the occupant(s) 402. For example, one or more image sensors 422 may be affixed to or built into the front pillar (e.g., the A pillar) on each side of the front passenger compartment 400 of the vehicle and positioned to monitor the head position of one or more occupant(s) 402. Multiple image sensors 422 may be placed along the dashboard 404, each configured to monitor one or more occupant's 402 head positions. In various embodiments, one or more image sensors 422 can be affixed to the ceiling of the vehicle compartment such as, for example, above the front passenger seats, and configured to monitor the head positions of occupants in the rear passenger compartment.

Other types of sensors may be implemented with front passenger compartment 400. Non-limiting examples of additional sensors which may include: weight or pressure sensors (e.g., seat-mounted weight sensors 424, headrest-mounted sensors); body positional sensors; seat position sensors; height sensors; and sensors for measuring other characteristics or conditions. For example, sensors capable of detecting vehicle operating conditions may sense that the vehicle is progressing in a certain direction. Certain calculations or assumptions can be made regarding an occupant's positioning based on the trajectory of a vehicle. In some embodiments, one or more sensors may be used to verify the positioning of an occupant's body or body part(s).

In some examples, one or more sensors in front passenger compartment 400 help determine the location, velocity, and/or acceleration of smart shoe device 224. The measurements of smart shoe device 224 may be used to help determine the future/intended actions of the operator, as described herein.

In some examples, the location, velocity, and/or acceleration of smart shoe device 224 is measured in smart shoe device 224 and send to vehicle 2 (e.g., via one or more communication or other vehicle systems, etc.). In some examples, the location, velocity, and/or acceleration of smart shoe device 224 is measured outside of smart shoe device 224 (e.g., front passenger compartment 400, etc.). In some examples, only the location is measured (inside or outside of smart shoe device 224) and the velocity and/or acceleration is calculated based on a location-time measurement determined by sensors throughout the vehicle and/or the shoe.

Vehicle occupant parameters determined using the sensor data may be provided to the airbag controller circuit 406 for use in generating control signals for operation of the airbag units 430. In various embodiments, pre-collision sensors are provided and configured to alert the airbag controller circuit 406 to vehicle external conditions which indicate that a collision is imminent or probable. The pre-collision sensors may include radar-based sensors, laser-based sensors, externally oriented cameras, gyroscopes, or any other suitable sensors.

In some examples, the location of operator 330 (e.g., either actual location based on sensor data generated by smart shoe device 224 or inferred location of other body parts based on location, acceleration, velocity, orientation, angle, and/or position of smart shoe device 224) may be used to alter operation of the vehicle. The vehicle may use this data to, for example, (1) brake some milliseconds earlier based on the determination that the collision is imminent or probable or (2) prepare the braking system for an emergency brake in the "near future."

Figure 5:
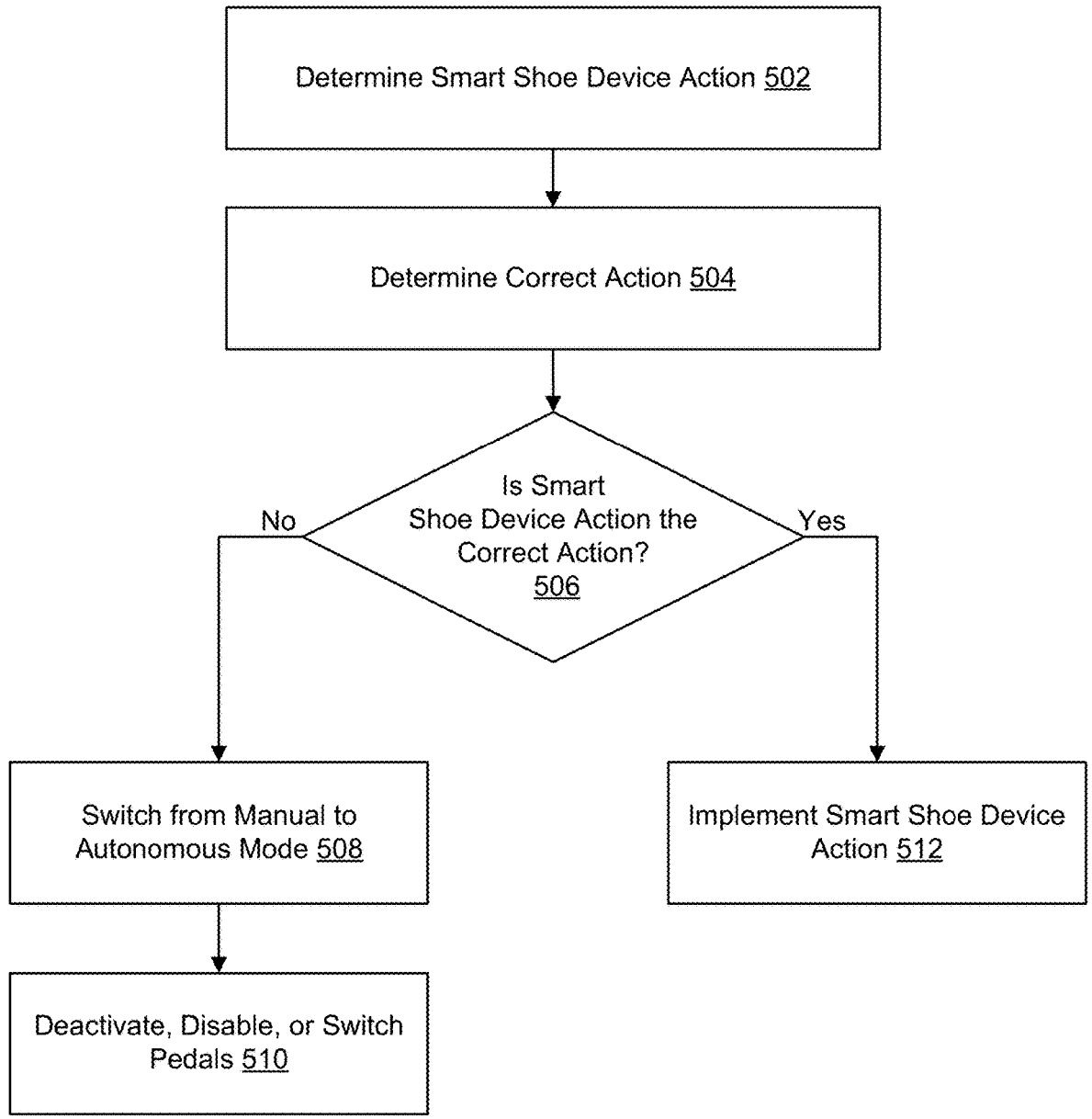
FIG. 5 illustrates a sample vehicle operation using a smart shoe device with which embodiments of the disclosed technology may be implemented.

FIG. 5 illustrates a sample vehicle operation using a smart shoe device with which embodiments of the disclosed technology may be implemented. The method may be implemented by a vehicle comprising a processor and memory unit operatively connected to the processor and including computer code, that when executed, causes processor to perform various operations described herein.

At 502, a smart shoe device action may be determined. The method proceeds to 504.

At 504, a correct action may be determined. The method proceeds to 506.

At 506, the method may determine whether the smart shoe device action is the correct action. If no, the method proceeds to 508. If yes, the method proceeds to 512.

At 508, the method may switch from manual to autonomous or semi-autonomous mode. The method proceeds to 510.

At 510, one or more pedals may be deactivated, disabled, or switched.

At 512, the smart shoe device action may be implemented.

Figure 6:
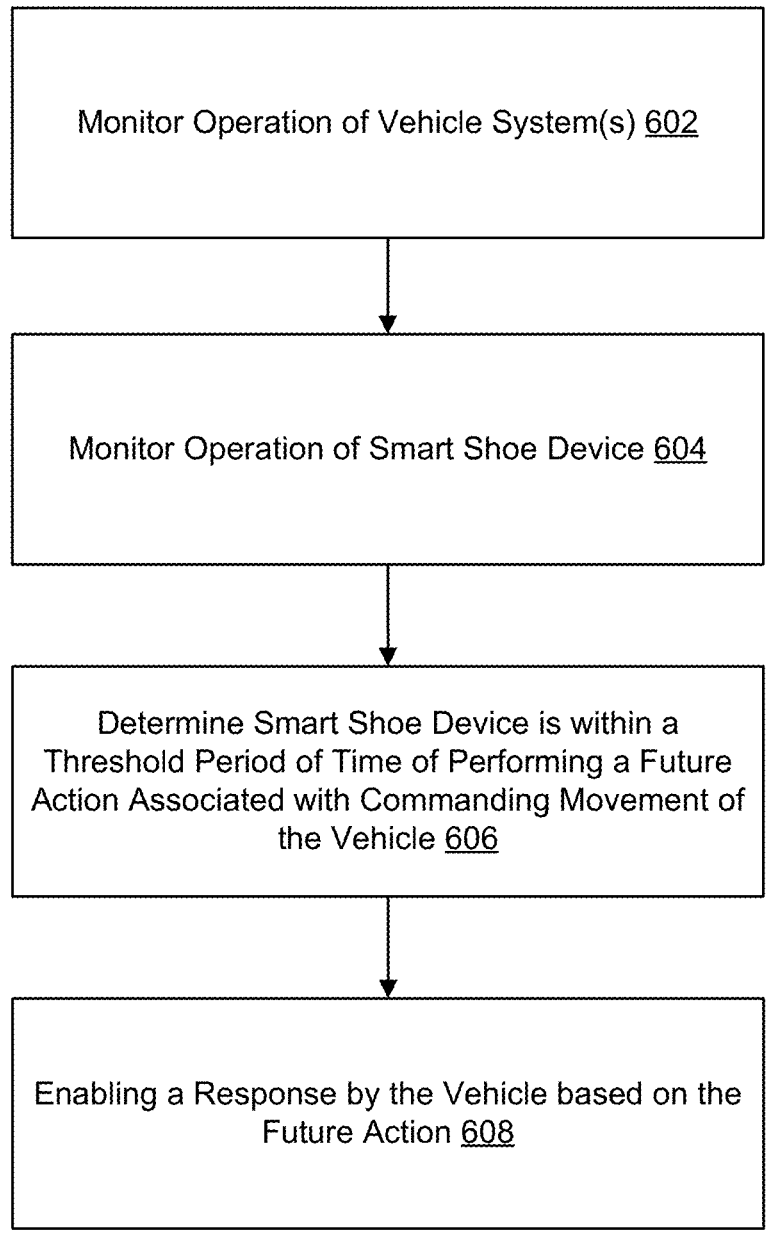
FIG. 6 illustrates a sample vehicle operation using a smart shoe device with which embodiments of the disclosed technology may be implemented.

FIG. 6 illustrates a sample vehicle operation using a smart shoe device with which embodiments of the disclosed technology may be implemented. The method may be implemented by a vehicle comprising a processor and memory unit operatively connected to the processor and including computer code, that when executed, causes processor to perform various operations described herein.

At 602, operation of a vehicle system may be monitored.

At 604, operation of a smart shoe device may be monitored.

In some examples, the operation of the smart shoe device identifies the smart shoe device as being inside or outside of the vehicle.

At 606, a determination may be made that the smart shoe device is within a threshold period of time of performing a future action associated with commanding movement of the vehicle.

In some examples, the vehicle system comprises an advanced driver assistance system (ADAS) and commanding movement of the vehicle from the advanced driver assistance system (ADAS) moves the vehicle along a roadway.

At 608, a response by the vehicle may be enabled based on the future action.

In some examples, the response by the vehicle is disabling an acceleration pedal of the vehicle. In some examples, the response by the vehicle is switching an acceleration pedal with a brake pedal of the vehicle.

In some examples, the operation of the smart shoe identifies the smart shoe device at a location outside of a threshold distance from the acceleration pedal of the vehicle, and the response by the vehicle is to adjust operation of an airbag based on the smart shoe being outside of the threshold distance from the acceleration pedal of the vehicle. In some examples, the adjustment to the operation of the airbag decreases an air pressure of the airbag upon deployment.

In some examples, the operation of the smart shoe identifies the smart shoe device at a location outside of a threshold distance from the acceleration pedal of the vehicle, and the response by the vehicle is to brake earlier or prepare a braking system for applying the brake within a threshold amount of time.

In some examples, the operation of the smart shoe identifies a velocity or acceleration of the smart shoe device outside of a threshold velocity or acceleration, and the response by the vehicle is to brake earlier or prepare a braking system for applying the brake within a threshold amount of time.

In some examples, the operation of the smart shoe identifies an unauthorized user attempting to operate the vehicle, and the response by the vehicle is to disable operation of the vehicle system. In some examples, the unauthorized user is a child or animal determined by a sensor in the vehicle. In some examples, the unauthorized user identified by comparing a user profile associated with the smart shoe device with sensor data generated by the vehicle.

Figure 7:
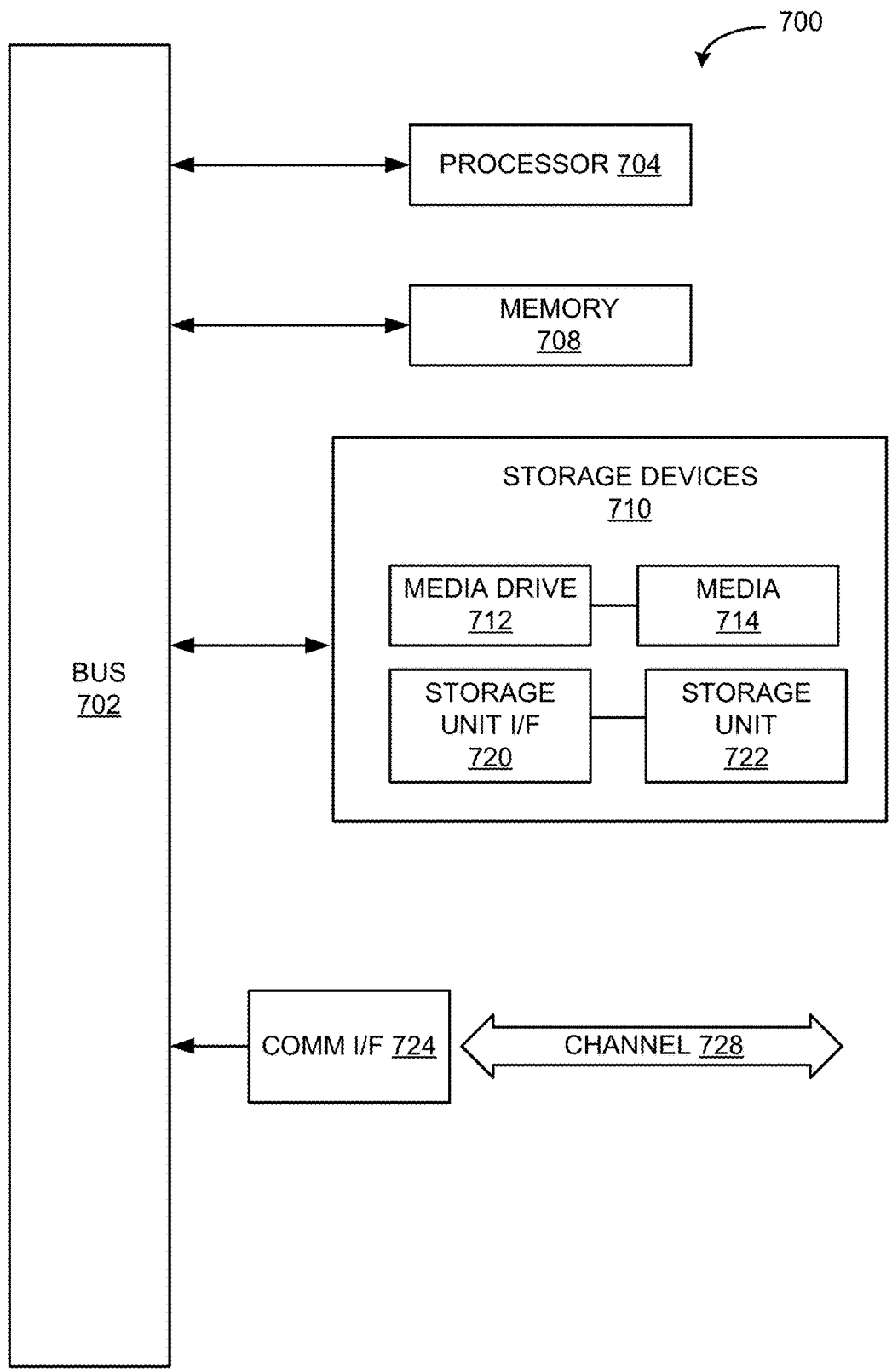
FIG. 7 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
a processor; and
a memory unit operatively connected to the processor and including computer code, that when executed, causes the processor to:
monitor operation of a vehicle system;
monitor operation of a smart shoe device;
determine that the smart shoe device is within a threshold period of time of performing a future action associated with commanding movement of the vehicle, wherein the commanding movement is determined while the vehicle is operating in a semi-autonomous mode or receiving manual commands from an operator; and
enable a response by the vehicle based on the future action,
wherein the operation of the smart shoe device identifies the smart shoe device at a location greater than a threshold distance from an acceleration pedal of the vehicle, and the response by the vehicle comprises adjusting operation of an airbag based on the smart shoe device being greater than the threshold distance from the acceleration pedal of the vehicle.

2. The vehicle of claim 1, wherein the vehicle system comprises an advanced driver assistance system (ADAS) and the commanding movement of the vehicle from the advanced driver assistance system (ADAS) moves the vehicle along a roadway.

3. The vehicle of claim 1, wherein the response by the vehicle is disabling the acceleration pedal of the vehicle.

4. The vehicle of claim 1, wherein the response by the vehicle is switching a function of the acceleration pedal with a function of a brake pedal of the vehicle.

5. The vehicle of claim 1, wherein the adjustment to the operation of the airbag decreases an inflation pressure of the airbag upon deployment.

6. The vehicle of claim 1, wherein, in addition to adjusting the operation of the airbag, the response by the vehicle in an autonomous and semi-autonomous mode is to apply a brake earlier than identified in data generated by the vehicle system for avoiding a road condition or obstacle or prepare a braking system for applying the brake within a threshold amount of time for avoiding the road condition or obstacle.

7. The vehicle of claim 1, wherein the operation of the smart shoe device identifies an unauthorized user attempting to operate the vehicle, and the response by the vehicle is to disable operation of the vehicle system.

8. The vehicle of claim 7, wherein the unauthorized user is identified by comparing a user profile associated with the smart shoe device with sensor data generated by the vehicle.

9. A computer-implemented method comprising:
monitoring operation of a vehicle system within a vehicle;
monitoring operation of a smart shoe device;
determining that the smart shoe device is within a threshold period of time of performing a future action associated with commanding movement of the vehicle, wherein the commanding movement is determined while the vehicle is operating in a semi-autonomous mode or receiving manual commands from an operator; and
enabling a response by the vehicle based on the future action,
wherein the operation of the smart shoe device identifies the smart shoe device at a location greater than a threshold distance from an acceleration pedal of the vehicle, and the response by the vehicle comprises adjusting operation of an airbag based on the smart shoe device being greater than the threshold distance from the acceleration pedal of the vehicle.

10. The computer-implemented method of claim 9, wherein the vehicle system comprises an advanced driver assistance system (ADAS) and the commanding movement of the vehicle from the advanced driver assistance system (ADAS) moves the vehicle along a roadway.

11. The computer-implemented method of claim 9, wherein the response by the vehicle is disabling the acceleration pedal of the vehicle.

12. The computer-implemented method of claim 9, wherein the response by the vehicle is switching a function of the acceleration pedal with a function of a brake pedal of the vehicle.

13. The computer-implemented method of claim 9, wherein the adjustment to the operation of the airbag decreases an inflation pressure of the airbag upon deployment.

14. The computer-implemented method of claim 9, wherein, in addition to adjusting the operation of the airbag, the response by the vehicle in an autonomous and semi-autonomous mode is to apply a brake earlier than identified in data generated by the vehicle system for avoiding a road condition or obstacle or prepare a braking system for applying the brake within a threshold amount of time for avoiding the road condition or obstacle.

15. The computer-implemented method of claim 9, wherein the operation of the smart shoe device identifies an unauthorized user attempting to operate the vehicle, and the response by the vehicle is to disable operation of the vehicle.

16. The computer-implemented method of claim 15, wherein the unauthorized user is identified by comparing a user profile associated with the smart shoe device with sensor data generated by the vehicle system.

\* \* \* \* \*